US012407250B2

(12) United States Patent
Zhao

(10) Patent No.: US 12,407,250 B2
(45) Date of Patent: Sep. 2, 2025

(54) SWITCHED-CAPACITOR VOLTAGE CONVERTER

(71) Applicant: Southchip Semiconductor Technology (Shanghai) Co., Ltd., Shanghai (CN)

(72) Inventor: Wei Zhao, Shanghai (CN)

(73) Assignee: Southchip Semiconductor Technology (Shanghai) Co., Ltd., Shanghai (CN)

( * ) Notice: Subject to any disclaimer, the term of this patent is extended or adjusted under 35 U.S.C. 154(b) by 174 days.

(21) Appl. No.: 18/482,013

(22) Filed: Oct. 5, 2023

(65) Prior Publication Data

US 2024/0186894 A1 Jun. 6, 2024

(30) Foreign Application Priority Data

Dec. 6, 2022 (CN) .......................... 202211552707.4

(51) Int. Cl.
*H02M 3/07* (2006.01)
(52) U.S. Cl.
CPC ..................................... *H02M 3/07* (2013.01)
(58) Field of Classification Search
CPC .... H02M 3/156; H02M 3/155; H02M 3/1552; H02M 3/1555; H02M 3/1557; H02M 3/157; H02M 3/158; H02M 3/1582; H02M 3/1584; H02M 1/325; H02M 1/38; H02M 1/385; H02M 1/32; H02M 1/322
See application file for complete search history.

(56) References Cited

U.S. PATENT DOCUMENTS

| 2015/0207401 A1* | 7/2015 | Zhang | H02M 3/07 323/271 |
|---|---|---|---|
| 2024/0113619 A1* | 4/2024 | Zhao | H02M 3/07 |
| 2024/0186898 A1* | 6/2024 | Huang | H02M 1/32 |

FOREIGN PATENT DOCUMENTS

| CN | 110071634 | 7/2019 |
| CN | 112202436 | 1/2021 |
| CN | 112910235 | 6/2021 |

* cited by examiner

*Primary Examiner* — Nguyen Tran
(74) *Attorney, Agent, or Firm* — JCIPRNET

(57) ABSTRACT

A switched-capacitor voltage converter including a switched-capacitor voltage conversion circuit, a loop regulator circuit, a first clamp transistor, a second clamp transistor, a first clamp circuit, and a second clamp circuit is provided. The loop regulator circuit is configured to monitor electrical parameters of any one or both of an input terminal and an output terminal of the switched-capacitor voltage converter, and output a voltage to a gate of the first clamp transistor or the second clamp transistor according to one or more electrical parameters to stabilize the one or more electrical parameters at their corresponding target values. According to the present disclosure, the loop regulator circuit is additionally configured in the switched-capacitor voltage converter, and two back-to-back clamp transistors are disposed between the input terminal and a reference terminal of the switched-capacitor voltage converter.

11 Claims, 4 Drawing Sheets

SWITCHED-CAPACITOR VOLTAGE CONVERTER

CROSS-REFERENCE TO RELATED APPLICATION

This application claims the priority benefit of China application serial no. 202211552707.4, filed on Dec. 6, 2022. The entirety of the above-mentioned patent application is hereby incorporated by reference herein and made a part of this specification.

BACKGROUND

Technical Field

The present disclosure relates to the technical field of power source management, and in particular, relates to a switched-capacitor voltage converter.

Description of Related Art

FIG. 1 illustrates a circuit diagram of a 2:1 switched-capacitor voltage converter according to a related art. An input terminal of the switched-capacitor voltage converter is configured to be connected to an input voltage $V_{bus}$, and an output terminal of the switched-capacitor voltage converter is configured to be connected to an output voltage $V_{out}$. For example, the input voltage $V_{bus}$ is 10 V, and the output voltage $V_{out}$ is 5 V. A two-way 2:1 switched-capacitor voltage conversion circuit is disposed between a reference terminal PMID and the output terminal of the switched-capacitor voltage converter. Substrates of a first switch transistor Q1A, a second switch transistor Q2A, a third switch transistor Q3A, a fourth switch transistor Q4A, a fifth switch transistor Q1B, a sixth switch transistor Q2B, a seventh switch transistor Q3B, and an eighth switch transistor Q4B in the switched-capacitor voltage conversion circuit are all connected to their respective sources. In this way, in response to the switched-capacitor voltage converter stopping operating, diodes are accordingly conducted from the output terminal to the reference terminal PMID of the switched-capacitor voltage converter.

In addition, a transistor QB is connected between the input terminal and the reference terminal PMID of the switched-capacitor voltage converter. A substrate of the transistor QB is connected to a source of the transistor QB, that is, the input terminal of the switched-capacitor voltage converter. A conduction direction of a parasitic diode of the transistor QB is from the input terminal to the reference terminal PMID of the switched-capacitor voltage converter. In response to the switched-capacitor voltage converter normally operating, the transistor QB is completely turned on, the input voltage $V_{bus}$ is equal to a reference voltage, the reference voltage is a voltage at the reference terminal PMID of the switched-capacitor voltage converter, and the output voltage $V_{out}$ is half of the input voltage $V_{bus}$. In response to the switched-capacitor voltage converter stopping operating, two groups of diodes with different orientations are connected in series between the input terminal and the output terminal of the switched-capacitor voltage converter, and thus the input terminal and the output terminal of the switched-capacitor voltage converter are completely disconnected.

However, in the related art, the switched-capacitor voltage converter has the following defects: 1) conversion at a fixed ratio is only implemented between the input voltage $V_{bus}$ and the output voltage $V_{out}$ of the switched-capacitor voltage converter; and 2) in response to the input voltage $V_{bus}$ of the switched-capacitor voltage converter being greater and the switched-capacitor voltage converter stopping operating, the switched-capacitor voltage converter needs components with a greater withstand voltage, and consequently manufacture costs of the switched-capacitor voltage converter are high.

SUMMARY

Various embodiments of the present disclosure are intended to provide a switched-capacitor voltage converter with low manufacture costs.

A switched-capacitor voltage converter includes: a switched-capacitor voltage conversion circuit, a loop regulator circuit, and a clamp circuit. The clamp circuit includes a first clamp transistor, a second clamp transistor, a first clamp circuit, and a second clamp circuit.

A drain of the first clamp transistor is connected to an input terminal of the switched-capacitor voltage converter, and a gate of the first clamp transistor is connected to a voltage output terminal of the loop regulator circuit.

A drain of the second clamp transistor is connected to a reference terminal of the switched-capacitor voltage converter, and a source of the second clamp transistor is connected to a source of the first clamp transistor.

The first clamp circuit is connected to both the gate and the drain of the first clamp transistor, and the second clamp circuit is connected to both a gate and the drain of the second clamp transistor.

The switched-capacitor voltage conversion circuit is connected between the reference terminal and an output terminal of the switched-capacitor voltage converter.

The first clamp circuit is configured to cause a voltage difference between the drain and the source of the first clamp transistor to be less than a withstand voltage of the first clamp transistor.

The second clamp circuit is configured to cause a voltage difference between the drain and the source of the second clamp transistor to be less than a withstand voltage of the second clamp transistor.

The loop regulator circuit is configured to monitor one or more electrical parameters related to any one or both of the input terminal and the output terminal of the switched-capacitor voltage converter, and output a voltage to the gate of the first clamp transistor or the second clamp transistor according to the one or more electrical parameters to stabilize the one or more electrical parameters at their corresponding target values.

In some embodiments, the switched-capacitor voltage converter further includes: a charge pump circuit. An input terminal of the charge pump circuit is connected to an output terminal of the loop regulator circuit, and an output terminal of the charge pump circuit is connected to any one or both of the first clamp transistor and the second clamp transistor, and the charge pump circuit is configured to cause any one or both of the first clamp transistor and the second clamp transistor to be completely turned on in response to the switched-capacitor voltage converter operating.

In some embodiments, the first clamp circuit includes a first resistor, a first gate regulator element, a first diode, and a first transistor. A negative electrode of the first gate regulator element is connected to the drain of the first clamp transistor, and a positive electrode of the first gate regulator element is connected to the source of the first clamp transistor via the first resistor.

A positive electrode of the first diode is connected to the drain of the first clamp transistor, a negative electrode of the first diode is connected to a drain of the first transistor, a source of the first transistor is connected to the gate of the first clamp transistor, and a gate of the first transistor is connected to a first connection point. The first connection point is located at a position on a connection line between the first gate regulator element and the first resistor.

In some embodiments, the first gate regulator element is a Zener diode or a series-connected diode or a series-connected transistor.

In some embodiments, the first clamp circuit includes a second resistor, a second gate regulator element, a second diode, and a second transistor. A negative electrode of the second gate regulator element is connected to the drain of the first clamp transistor via the second resistor, and a positive electrode of the second gate regulator element is connected to the source of the first clamp transistor. A negative electrode of the second diode is connected to the gate of the first clamp transistor, a positive electrode of the second diode is connected to a drain of the second transistor, a source of the second transistor is connected to the drain of the first clamp transistor, and a gate of the second transistor is connected to a second connection point. The second connection point is located at a position on a connection line between the second gate regulator element and the second resistor.

In some embodiments, the second gate regulator element is a Zener diode or a series-connected diode or a series-connected transistor.

In some embodiments, the switched-capacitor voltage conversion circuit is a two-way 2:1 switched-capacitor voltage conversion circuit.

In some embodiments, the switched-capacitor voltage conversion circuit includes a first branch and a second branch. One terminal of the first branch is connected to the reference terminal of the switched-capacitor voltage converter, and another terminal of the first branch is connected to the ground; and one terminal of the second branch is connected to the reference terminal of the switched-capacitor voltage converter, and another terminal of the second branch is connected to the ground.

The first branch includes a first switched capacitor, and a first switch transistor, a second switch transistor, a third switch transistor, and a fourth switch transistor that are successively connected in series. The first switched capacitor is connected in parallel to two terminals of the series-connected second switch transistor and third switch transistor.

The second branch includes a second switched capacitor, and a fifth switch transistor, a sixth switch transistor, a seventh switch transistor, and an eighth switch transistor that are successively connected in series. The second switched capacitor is connected in parallel to two terminals of the series-connected sixth switch transistor and seventh switch transistor.

A middle point of the first branch and a middle point of the second branch are both connected to the output terminal of the switched-capacitor voltage converter. The middle point of the first branch is located at a position on a connection line between the second switch transistor and the third switch transistor, and the middle point of the second branch is located at a position on a connection line between the sixth switch transistor and the seventh switch transistor.

In some embodiments, a conduction direction of the switch transistors of the first branch is from a ground point of the first branch to the reference terminal of the switched-capacitor voltage converter, and a conduction direction of the switch transistors of the second branch is from a ground point of the second branch to the reference terminal of the switched-capacitor voltage converter.

In some embodiments, the output terminal of the switched-capacitor voltage converter is connected to the ground via an output capacitor, the output capacitor is further connected in parallel to an output resistor.

In some embodiments, the reference terminal of the switched-capacitor voltage converter is connected to the ground via a reference capacitor.

According to the embodiments of the present disclosure, two transistors with opposite conduction directions are disposed between the input terminal and the reference terminal PMID of the switched-capacitor voltage converter, and the loop regulator circuit is additionally configured. Therefore, in response to the switched-capacitor voltage converter operating, a relationship between the input voltage $V_{bus}$ and the output voltage $V_{out}$ of the switched-capacitor voltage converter may be adjusted by adjusting a voltage drop of one of the two transistors. In response to the switched-capacitor voltage converter stopping operating, since a clamp circuit is connected in parallel to the newly added transistor, in one aspect, the voltage difference between the drain and the source of the clamp transistor is less than a withstand voltage of the clamp transistor, and in another aspect, the input voltage in the switched-capacitor voltage converter is reduced, and transistors with an even less withstand voltage may be selected for use in the switched-capacitor voltage converter. In this way, manufacture costs are reduced.

BRIEF DESCRIPTION OF THE DRAWINGS

For clearer description of the technical solutions in the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

DESCRIPTION OF THE EMBODIMENTS

The technical solutions contained in the embodiments of the present disclosure are described in detail clearly and completely hereinafter with reference to the accompanying drawings for the embodiments of the present disclosure. Apparently, the described embodiments are only a portion of embodiments of the present disclosure, but not all the embodiments of the present disclosure. Based on the embodiments of the present disclosure, all other embodiments derived by persons of ordinary skill in the art without any creative efforts shall fall within the protection scope of the present disclosure.

Figure 1:
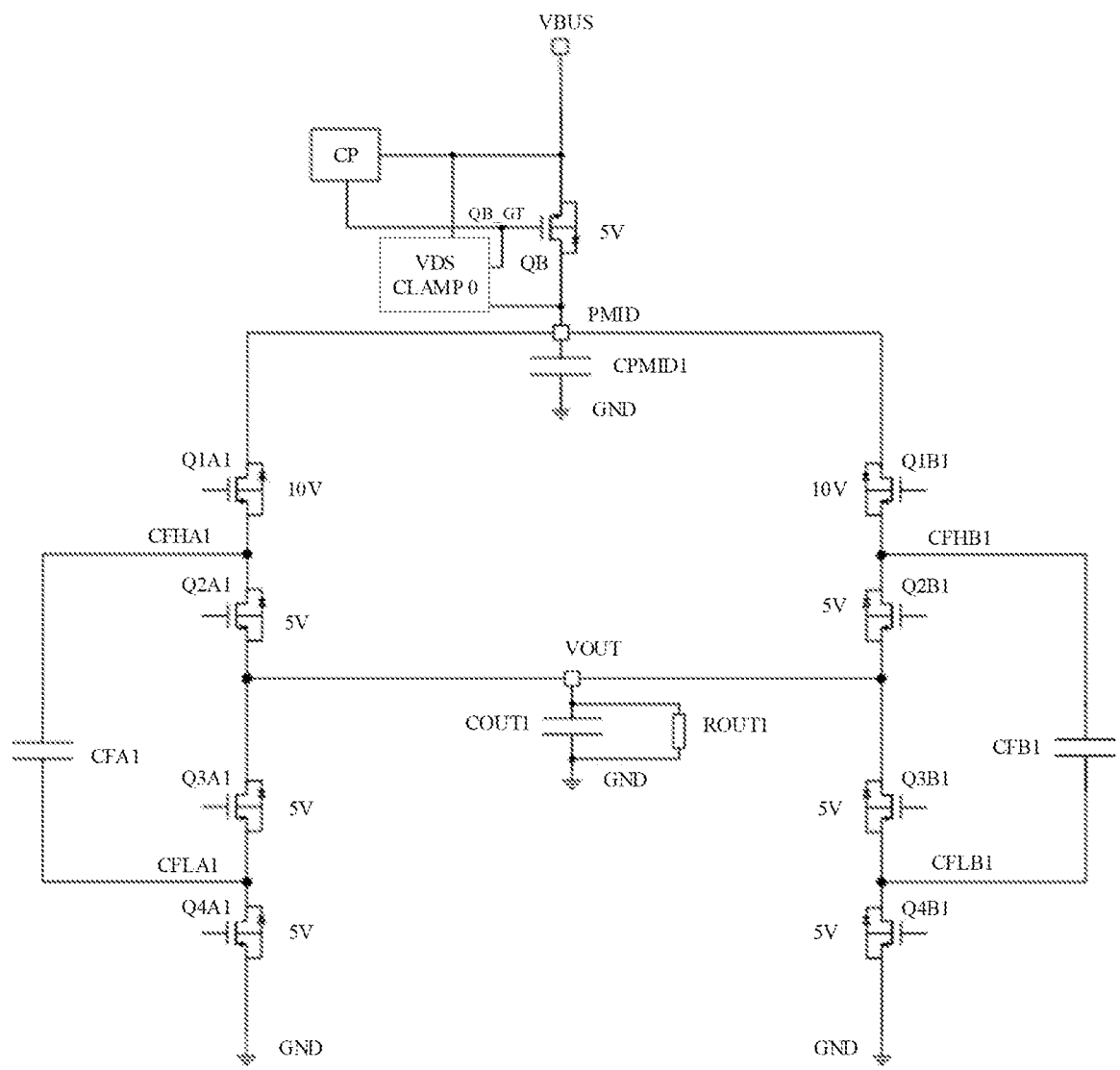
FIG. 1 illustrates a switched-capacitor voltage converter in the related art.

FIG. 1 illustrates a switched-capacitor voltage converter according to the related art. An input terminal of the switched-capacitor voltage converter is configured to be connected to an input voltage $V_{bus}$, and an output terminal of the switched-capacitor voltage converter is configured to be connected to an output voltage $V_{out}$. For example, the input voltage $V_{bus}$ is 10 V, and the output voltage $V_{out}$ is 5 V In response to the switched-capacitor voltage converter stopping operating, the input terminal and the output terminal of the switched-capacitor voltage converter need to be bidirectionally disconnected.

As illustrated in FIG. 1, a two-way 2:1 switched-capacitor voltage conversion circuit is connected between a reference terminal PMID and the output terminal of the switched-capacitor voltage converter. The output voltage $V_{out}$ is half of a reference voltage. The reference voltage is a voltage at the reference terminal PMID of the switched-capacitor voltage converter. In the two-way 2:1 switched-capacitor voltage conversion circuit, substrates of a first switch transistor Q1A, a second switch transistor Q2A, a third switch transistor Q3A, a fourth switch transistor Q4A, a fifth switch transistor Q1B, a sixth switch transistor Q2B, a seventh switch transistor Q3B, and an eighth switch transistor Q4B are all connected to their respective sources. In this way, in response to the switched-capacitor voltage converter stopping operating, diodes are accordingly conducted from the output terminal to the reference terminal PMID of the switched-capacitor voltage converter.

A transistor QB is connected between the input terminal and the reference terminal PMID of the switched-capacitor voltage converter (that is, an input terminal of the switched-capacitor voltage conversion circuit). A substrate of the transistor QB is connected to a source of the transistor QB, that is, the input terminal of the switched-capacitor voltage converter. A conduction direction of a parasitic diode of the transistor QB is from the input terminal to the reference terminal PMID of the switched-capacitor voltage converter. In response to the switched-capacitor voltage converter normally operating, the transistor QB is completely turned on, the input voltage $V_{bus}$ is equal to the reference voltage, and the output voltage $V_{out}$ is half of the input voltage $V_{bus}$. In response to the switched-capacitor voltage converter stopping operating, two groups of diodes with different orientations are connected in series between the input terminal and the output terminal of the switched-capacitor voltage converter, and thus the input terminal and the output terminal of the switched-capacitor voltage converter are completely disconnected.

In response to the switched-capacitor voltage converter operating, since the parasitic diode of the transistor QB is conducted from the input terminal to the reference terminal PMID of the switched-capacitor voltage converter, and the transistor QB is completely turned on, a voltage difference between the input terminal and the reference terminal PMID of the switched-capacitor voltage converter fails to be regulated, and the output voltage $V_{out}$ may be fixedly half of the input voltage $V_{bus}$ and fails to be regulated. In response to the switched-capacitor voltage converter stopping operating, since the transistor QB is forward turned on, when the output voltage $V_{out}$ is 0 V and no voltage is detected on a first switched capacitor CFA or a second switched capacitor CFB, a voltage at a connection point CFHA or a connection point CFHB is 0 V The connection point CFHA is located at a position on a connection line between the first switch transistor Q1A and the second switch transistor Q2A, and the connection point CFHB is located at a position on a connection line between the fifth switch transistor Q1B and the sixth switch transistor Q2B. When the input voltage $V_{bus}$ is 10 V, the parasitic diode of the transistor QB is present between the input terminal and the reference terminal PMID of the switched-capacitor voltage converter. Therefore, the reference voltage is 10 V–VD, VD represents a voltage between two terminals of the parasitic diode of the transistor QB. A voltage at one end of the first switch transistor Q1A or the fifth switch transistor Q1B connected to the reference terminal PMID of the switched-capacitor voltage converter is 10 V–VD. Withstand voltages of the first switch transistor Q1A and the fifth switch transistor Q1B are both about 10 V.

Therefore, the switched-capacitor voltage converter is defective in that the relationship between the input voltage $V_{bus}$ and the output voltage $V_{out}$ fails to be regulated during operating of the switched-capacitor voltage converter. In response to the switched-capacitor voltage converter stopping operating, a withstand voltage of the transistor QB needs to exceed a maximum value of the input voltage $V_{bus}$. Therefore, manufacture costs of the switched-capacitor voltage converter are high.

Some embodiments of the present disclosure are intended to provide a switched-capacitor voltage converter with low manufacture costs.

To make the objects, features, and advantages of the present disclosure clearer and more understandable, the present disclosure is described in detail with reference to the attached drawings and specific embodiments.

Figure 2:
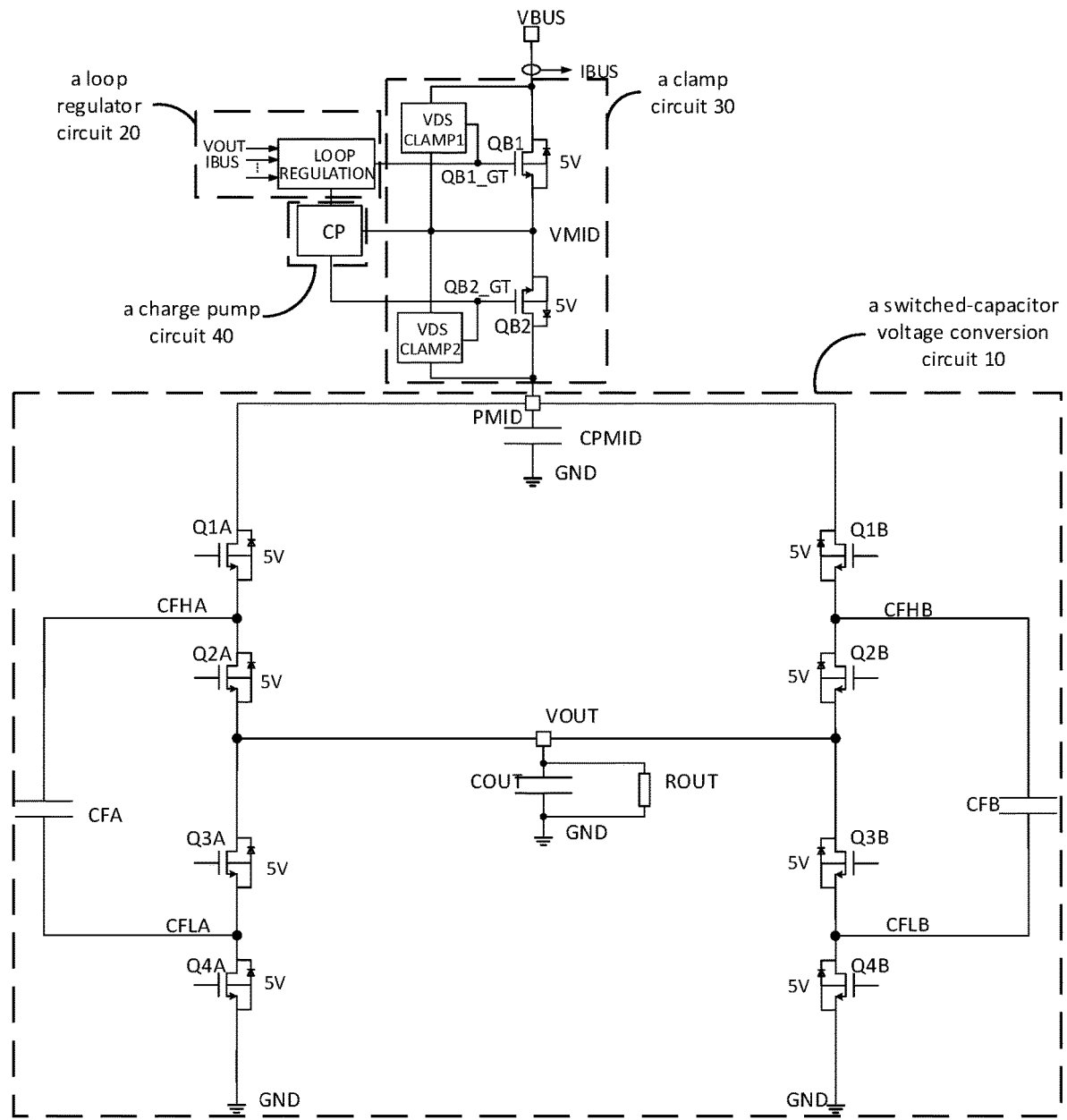
FIG. 2 illustrates a switched-capacitor voltage converter according to an embodiment of the present disclosure.

As illustrated in FIG. 2, the switched-capacitor voltage converter according to the embodiments of the present disclosure includes: a switched-capacitor voltage conversion circuit 10, a loop regulator circuit 20, and a clamp circuit 30. The clamp circuit 30 includes a first clamp transistor QB1, a second clamp transistor QB2, a first clamp circuit VDS CLAMP1, and a second clamp circuit VDS CLAMP2.

A drain of the first clamp transistor QB1 is connected to an input terminal of the switched-capacitor voltage converter, and a gate QB1_GT of the first clamp transistor QB1 is connected to a voltage output terminal of the loop regulator circuit 20.

A drain of the second clamp transistor QB2 is connected to a reference terminal PMID of the switched-capacitor voltage converter, and a source of the second clamp transistor QB2 is connected to a source of the first clamp transistor QB1. In addition, a connection point VMID is located at a position on a connection line between the source of the first clamp transistor QB1 and the source of the second clamp transistor QB2.

The switched-capacitor voltage conversion circuit 10 is connected between the reference terminal and an output terminal of the switched-capacitor voltage converter. That is, the reference terminal PMID of the switched-capacitor voltage converter is an input terminal of the switched-capacitor voltage conversion circuit 10.

The first clamp circuit VDS CLAMP1 is connected to the gate QB1_GT and the drain of the first clamp transistor QB1, and is configured to cause a voltage difference VDS between the drain and the source of the first clamp transistor QB1 to be less than a withstand voltage of the first clamp transistor QB1.

The second clamp circuit VDS CLAMP2 is connected to a gate QB2_GT and the drain of the second clamp transistor QB2, and is configured to cause a voltage difference VDS between the drain and the source of the second clamp circuit QB2 to be less than a withstand voltage of the second clamp transistor QB2.

In some embodiments, the first clamp circuit VDS CLAMP1 and the second clamp circuit VDS CLAMP2 are further both connected to the connection point VMID.

The loop regulator circuit 20 is configured to monitor one or more electrical parameters related to any one or both of the input terminal and the output terminal of the switched-capacitor voltage converter, and output a voltage to the gate of the first clamp transistor QB1 or the second clamp transistor QB2 according to the one or more electrical parameters to stabilize the one or more electrical parameters at their corresponding target values.

The one or more electrical parameters may include any electrical parameter of, for example, the output voltage $V_{out}$, an input current $I_{bus}$, and other parameters. For example, the output voltage $V_{out}$ is stabilized at a corresponding target value.

In some embodiments, the switched-capacitor voltage converter may further include a charge pump (CP) circuit 40 (in FIG. 2, the charge pump circuit 40 is represented by CP). An input terminal of the charge pump circuit 40 is connected to an output terminal of the loop regulator circuit 20, and one output terminal of the charge pump circuit 40 is connected to the gate QB2_GT of the second clamp transistor QB2, and another output terminal of the charge pump circuit 40 is connected to the connection point VMID. The charge pump circuit 40 is configured to cause any one or both of the first clamp transistor QB1 and the second clamp transistor QB2 to be completely turned on in response to the switched-capacitor voltage converter operating.

In some embodiments, the first clamp transistor QB1 and the second clamp transistor QB2 may be both an N-channel metal-oxide-semiconductor (NMOS). A greater voltage is desired to start the NMOS. In response to the switched-capacitor voltage converter operating, the charge pump circuit 40 may raise a voltage at the gate of the second clamp transistor QB2 to a specific value exceeding a voltage at the connection point VMID, and completely turn on the second clamp transistor QB2, such that the voltage at the connection point VMID is maintained consistent with the reference voltage. Likewise, in response to the switched-capacitor voltage converter operating, if the output voltage $V_{out}$ exceeds the target value, the charge pump circuit 40 may also not completely turn on the first clamp transistor QB1, such that a voltage drop is caused between the source and the drain of the first clamp transistor QB1. In this way, the output voltage $V_{out}$ is stabilized at the target value.

In some embodiments, as illustrated in FIG. 2, the switched-capacitor voltage conversion circuit 10 between the reference terminal PMID and the output terminal of the switched-capacitor voltage converter may be a two-way 2:1 switched-capacitor voltage conversion circuit. In some other embodiments, the switched-capacitor voltage conversion circuit 10 with other conversion ratios may also be employed according to actual needs.

The two-way 2:1 switched-capacitor voltage conversion circuit includes a first branch and a second branch. One terminal of the first branch is connected to the reference terminal PMID of the switched-capacitor voltage converter, and another terminal of the first branch is connected to the ground; and one terminal of the second branch is connected to the reference terminal PMID of the switched-capacitor voltage converter, and another terminal of the second branch is connected to the ground.

The first branch includes a first switched capacitor CFA, and a first switch transistor Q1A, a second switch transistor Q2A, a third switch transistor Q3A, and a fourth switch transistor Q4A that are successively connected in series. The first switched capacitor CFA is connected in parallel to two terminals of the second switch transistor Q2A and third switch transistor Q3A that are series-connected. A connection point CFHA is located at a position on a connection line between the first switch transistor Q1A and the second switch transistor Q2A. A connection point CFLA is located at a position on a connection line between the third switch transistor Q3A and the fourth switch transistor Q4A. Therefore, the first switched capacitor CFA is connected in parallel to the connection point CFHA and the connection point CFLA.

The second branch includes a second switched capacitor CFB, and a fifth switch transistor Q1B, a sixth switch transistor Q2B, a seventh switch transistor Q3B, and an eighth switch transistor Q4B that are successively connected in series. The second switched capacitor CFB is connected in parallel to two terminals of the sixth switch transistor Q2B and seventh switch transistor Q3B that are series-connected. A connection point CFHB is located at a position on a connection line between the fifth switch transistor Q1B and the sixth switch transistor Q2B. A connection point CFLB is located at a position on a connection line between the seventh switch transistor Q3B and the eighth switch transistor Q4B. Therefore, the second switched capacitor CFB is connected in parallel to the connection point CFHB and the connection point CFLB.

A middle point of the first branch and a middle point of the second branch are both connected to the output terminal of the switched-capacitor voltage converter. The middle point of the first branch is a point on a connection line between the second switch transistor Q2A and the third switch transistor Q3A. The middle point of the second branch is a point on a connection line between the sixth switch transistor Q2B and the seventh switch transistor Q3B.

The input terminal of the switched-capacitor voltage conversion circuit 10 is connected to the ground via a reference capacitor CPMID, and an output terminal of the switched-capacitor voltage conversion circuit 10 is connected to the ground via an output capacitor COUT. The output capacitor COUT is further connected in parallel to an output resistor ROUT.

The first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B, and the eighth switch transistor Q4B all are transistors with the same withstand voltage. Conduction directions of these transistors are all from the ground point to the reference terminal PMID of the switched-capacitor voltage converter, and substrates of these transistors are all connected to their respective sources. In this way, in response to the switched-capacitor voltage converter stopping operating, diodes are accordingly conducted from the output terminal to the reference terminal PMID of the switched-capacitor voltage converter, and no diode is conducted from the reference terminal PMID to the output terminal of the switched-capacitor voltage converter. In response to the switched-capacitor voltage converter normally operating, the output voltage $V_{out}$ is half of the reference voltage.

Figure 3A:
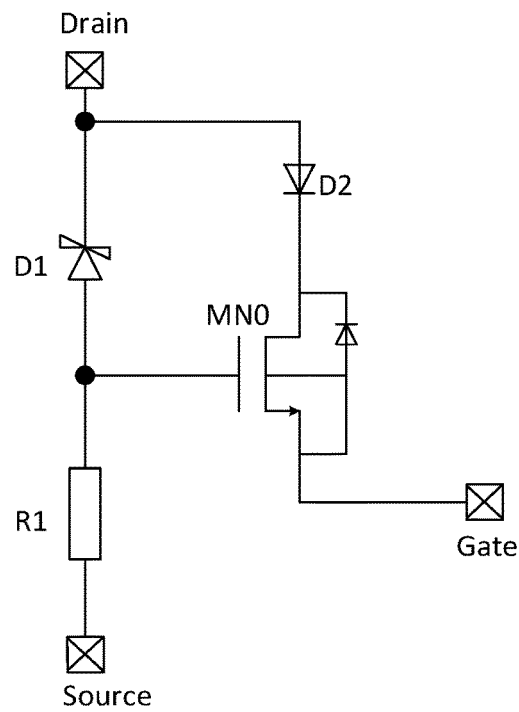
FIG. 3A and FIG. 3B are circuit diagrams of two clamp circuits according to an embodiment of the present disclosure, wherein in FIG. 3A, regulation is conducted by raising a voltage at the gate of a first transistor MN0, and in FIG. 3B, regulation is conducted by reducing a voltage at the gate of a second transistor MP0.

In some embodiments, the first clamp circuit VDS CLAMP1 and the second clamp circuit VDS CLAMP2 of FIG. 2 may include a first resistor R1, a first gate regulator element D1, a first diode D2, and the first transistor MN0, as illustrated in FIG. 3A.

Using the first gate regulator element D1 being a Zener diode as an example, a negative electrode of the first gate diode is connected to the drain of the first clamp transistor QB1 or the drain of the second clamp transistor QB2, and a positive electrode of the first gate regulator element D1 is connected to the source of the first clamp transistor QB1 or the second clamp transistor QB2 via the first resistor R1.

A positive electrode of the first diode D2 is connected to the drain of the first clamp transistor QB1 or the drain of the second clamp transistor QB2, a negative electrode of the first diode D2 is connected to a drain of the first transistor MN0, a source of the first transistor MN0 is connected to the gate of the first clamp transistor QB1 or the second clamp transistor QB2, and a gate of the first transistor MN0 is connected to a first connection point. The first connection point is located at a position on a connection line between the first gate regulator element D1 and the first resistor R1.

In response to a voltage difference VDS between the drain and the source of the first clamp transistor QB1 or the second clamp transistor QB2 exceeding a voltage of the first gate regulator element D1, a voltage starts to be present at the first resistor R1, the voltage at the gate of the first transistor MN0 is raised, and the first transistor MN0 raises its voltage at the source. That is, a voltage at the gate of the first clamp transistor QB1 or the second clamp transistor QB2 is raised.

It should be noted that the first gate regulator element D1 is merely an option to cause a clamp voltage to be 5 V The first gate regulator element D1 may also be other structures depending on different requirements on the clamp voltage. For example, the first gate regulator element D1 may be a series-connected diode or a series-connected transistor, or any other structure.

Figure 4A:
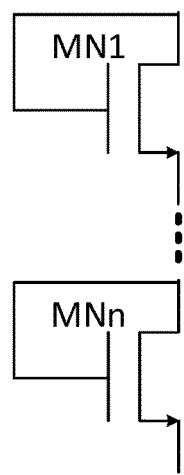
FIG. 4A to FIG. 4C are schematic structural diagrams of replacement of a Zener diode according to an embodiment of the present disclosure, wherein FIG. 4A, the Zener diode is replaced by a series-connected transistor MN1-MNn, in FIG. 4B, the Zener diode is replaced by a series-connected transistor MN1-MPn, and in FIG. 4C, the Zener diode is replaced by a series-connected diode Dn.

As illustrated in FIG. 4A, a plurality of series-connected transistors replace the first gate regulator element D1 in FIG. 3A. A drain of a 1$^{st}$-ranked transistor MN1 is connected to the drain of the first clamp transistor QB1 or the second clamp transistor QB2, a source of the 1$^{st}$-ranked transistor MN1 is connected to a drain of a next transistor, a source of a last transistor MNn, which is ranked at an n$^{th}$ place, is connected to the source of the first clamp transistor QB1 or the second clamp transistor QB2 via the first resistor R1, and gates of these transistors are connected to their respective drains. The n represents the number of series-connected transistors and is an integer greater than 1.

Figure 3B:
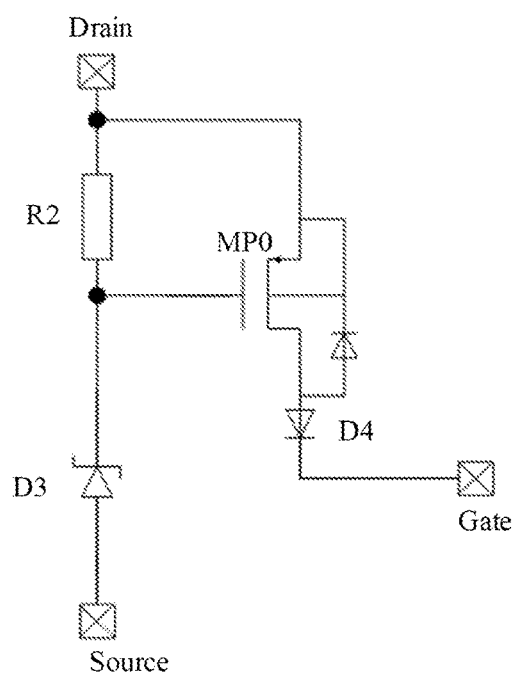
Figure 4B:
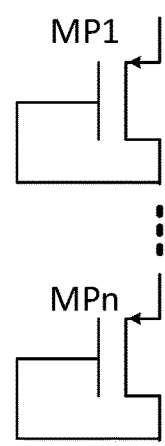

As illustrated in FIG. 4B, a plurality of series-connected transistors replace the first gate regulator element D1 in FIG. 3B. A source of a 1$^{st}$-ranked transistor MP1 is connected to the drain of the first clamp transistor QB1 or the second clamp transistor QB2 via the first resistor R1, a drain of the 1$^{st}$-ranked transistor MP1 is connected to a source of the next transistor, the drain of the last transistor MPn, which is ranked at an n$^{th}$ place, is connected to the source of the first clamp transistor QB1 or the second clamp transistor QB2, and the gates of these transistors are connected to their respective drains. The n represents the number of series-connected transistors and is an integer greater than 1.

Figure 4C:

As illustrated in FIG. 4C, a plurality of series-connected diodes replace the first gate regulator element D1 in FIG. 3A or FIG. 3B. Conduction directions of the series-connected diodes are all from the drain to the source of the first clamp transistor QB1 or the second clamp transistor QB2.

In some embodiments, the first clamp circuit VDS CLAMP1 and the second clamp circuit VDS CLAMP2 of FIG. 2 may include a second resistor R2, a second gate regulator element D3, a second diode D4, and the second transistor MP0, as illustrated in FIG. 3B.

Using the second gate regulator element D3 being a Zener diode as an example, a negative electrode of the second gate regulator element D3 is connected to the drain of the first clamp transistor QB1 or the drain of the second clamp transistor QB2 via the second resistor R2, and a positive electrode of the second gate regulator element D3 is connected to the source of the first clamp transistor QB1 or the source of the second clamp transistor QB2.

A negative electrode of the second diode D4 is connected to the gate of the first clamp transistor QB1 or the second clamp transistor QB2, a positive electrode of the second diode D4 is connected to a drain of the second transistor MP0, a source of the second transistor MP0 is connected to the drain of the first clamp transistor QB1 or the second clamp transistor QB2, and a gate of the second transistor MP0 is connected to a second connection point. The second connection point is located at a position on a connection line between the second gate regulator element D3 and the second resistor R2.

In response to a voltage difference VDS between the drain and the source of the first clamp transistor QB1 or the second clamp transistor QB2 exceeding a voltage of the second gate regulator element D3, a voltage starts to be present at the second resistor R2, the voltage at the gate of the second transistor MP0 is reduced, and the second transistor MP0 raises its voltage at the drain. That is, the voltage at the gate of the first clamp transistor QB1 or the second clamp transistor QB2 is raised.

It should be noted that the second gate regulator element D3 is merely an option to cause a clamp voltage to be 5 V The second gate regulator element D3 may also be other structures depending on different requirements on the clamp voltage, for example, the second gate regulator element D3 may be a series-connected diode or a series-connected transistor, or any other structure.

Hereinafter, the operation process of the structure as illustrated in FIG. 2 is described using the input voltage $V_{bus}$ being 10 V and the target value of the output voltage $V_{out}$ being 5 V as examples.

In response to the switched-capacitor voltage converter normally operating, the charge pump circuit 40 at the connection point VMID operates to raise the voltage at the gate of the second clamp transistor QB2 to a specific value exceeding the voltage at the connection point VMID and completely turn on the second clamp transistor QB2, such that the voltage at the connection point VMID is equal to the reference voltage. In this case, the loop regulator circuit 20 is configured to monitor a difference between any electrical parameter of the output voltage $V_{out}$, the input current $I_{bus}$, and other parameters and its corresponding target value. For example, in the case that the output voltage $V_{out}$ is 6 V and the target value of the output voltage $V_{out}$ is 5 V, the output voltage $V_{bus}$ exceeds 10 V and reaches 12 V In this case, the charge pump circuit 40 is configured to control the voltage at the gate of the first clamp transistor QB1 to not completely turn on the first clamp transistor QB1, the loop regulator circuit 20 is configured to control the first clamp circuit VDS CLAMP1 to clamp an exceeding voltage portion, that is, the 2 V voltage. In this case, the voltage at the gate of the first clamp transistor QB1 and a voltage at the source of the first clamp transistor QB1 are reduced, the reference voltage is also reduced, and the output voltage $V_{out}$ half of the reference voltage is also reduced. In this way, the output voltage $V_{out}$ may be stabilized at the target value.

In response to the switched-capacitor voltage converter stopping operating, a residual voltage is still present at the input terminal of the switched-capacitor voltage converter. If the input voltage $V_{bus}$ is less than 5 V, the voltage at the connection point VMID and the reference voltage are maintained 0 V If the input voltage $V_{bus}$ is greater than 5 V, the first clamp circuit VDS CLAMP1 of the first clamp transistor QB1 starts functioning, and the voltage at the connection point VMID is raised and maintained at about a difference between the actual input voltage $V_{bus}$ and 5 V Since the connection point VMID is disconnected from the output terminal of the switched-capacitor voltage converter, the input terminal and the output terminal of the switched-capacitor voltage converter are completely disconnected. In addition, in response to the input voltage $V_{bus}$ reaches a maximum value 10 V, the voltage at the connection point VMID and the reference voltage are both 5 V, the voltage at the connection point CFHA or CFHB is 0 V, the voltage between two terminals of the first switch transistor Q1A or the fifth switch transistor Q1B is also 5 V, and the voltages of all the transistors do not exceed their withstand voltages.

In response to the switched-capacitor voltage converter stopping operating, a maximum value of the output voltage $V_{out}$ is 5 V, two diodes are connected in series between the output terminal and the reference terminal PMID of the switched-capacitor voltage converter. Therefore, the reference voltage is in the range of 5 V to 2*VD. The second transistor QB2 is turned off, and even a maximum voltage difference VDS between the drain and the source of the second transistor QB2 does not exceed a threshold of the second clamp circuit VDS CLAMP2. Therefore, the reference terminal PMID of the switched-capacitor voltage converter is disconnected from the connection point VMID, and thus the output terminal and the input terminal of the switched-capacitor voltage converter are still completely disconnected.

In summary, the switched-capacitor voltage converter according to the present disclosure has the following advantages: The switched-capacitor voltage converter includes: a switched-capacitor voltage conversion circuit, a loop regulator circuit, and a clamp circuit. The clamp circuit includes a first clamp transistor, a second clamp transistor, a first clamp circuit, and a second clamp circuit. In response to the switched-capacitor voltage converter operating, disposing two back-to-back transistors, i.e., the first clamp transistor and the second clamp transistor, with a voltage difference VDS between sources and drains between the input terminal and the reference terminal PMID of the switched-capacitor voltage converter regulating in a loop-wise manner the relationship between the input voltage $V_{bus}$ and the output voltage $V_{out}$, such that one or more electrical parameters such as the output voltage $V_{out}$ or the input current $I_{bus}$ are stabilized. In response to the switched-capacitor voltage converter stopping operating, since a clamp circuit is connected in parallel to the newly added transistor, in one aspect, the voltage difference VDS between the drain and the source of the clamp transistor is less than a withstand voltage of the clamp transistor, and in another aspect, the input voltage $V_{bus}$ in the switched-capacitor voltage conversion circuit is reduced, and transistors with an even less withstand voltage may be selected for use in the switched-capacitor voltage converter. In this way, manufacture costs are reduced.

Various embodiments in the specification are described in a progressive manner. The same or similar parts between the embodiments may be referenced to each other. In each embodiment, the portion that is different from other embodiments is concentrated and described. With respect to the system disclosed in the embodiments, since the apparatus embodiments are substantially similar to the method embodiments, brief description is given thereto. The related portions may be referenced to the description of the portions in the method embodiments.

In the specification, the principles and embodiments of the present disclosure are illustrated with reference to specific exemplary embodiments or examples. However, the description of the above embodiments is merely for ease of understanding of the method and core concept of the present disclosure. In the meantime, persons of ordinary skill in the art would derive variations or modifications to the present disclosure based on the concept of the present disclosure and the specific embodiments and application scope thereof. In conclusion, the content of the specification shall not be construed as limiting the present disclosure.

What is claimed is:

1. A switched-capacitor voltage converter, comprising:
a switched-capacitor voltage conversion circuit;
a loop regulator circuit; and
a clamp circuit, wherein the clamp circuit comprises a first clamp transistor, a second clamp transistor, a first clamp circuit, and a second clamp circuit, wherein
a drain of the first clamp transistor is connected to an input terminal of the switched-capacitor voltage converter, and a gate of the first clamp transistor is connected to a voltage output terminal of the loop regulator circuit;
a drain of the second clamp transistor is connected to a reference terminal of the switched-capacitor voltage converter, and a source of the second clamp transistor is connected to a source of the first clamp transistor;
the first clamp circuit is connected to both the gate and the drain of the first clamp transistor, and the second clamp circuit is connected to both a gate and the drain of the second clamp transistor;
the switched-capacitor voltage conversion circuit is connected between the reference terminal and an output terminal of the switched-capacitor voltage converter;
the first clamp circuit is configured to cause a voltage difference between the drain and the source of the first clamp transistor to be less than a withstand voltage of the first clamp transistor;
the second clamp circuit is configured to cause a voltage difference between the drain and the source of the second clamp transistor to be less than a withstand voltage of the second clamp transistor; and
the loop regulator circuit is configured to monitor one or more electrical parameters related to any one or both of the input terminal and the output terminal of the switched-capacitor voltage converter, and output a voltage to the gate of the first clamp transistor or the second clamp transistor according to the one or more electrical parameters to stabilize the one or more electrical parameters at their corresponding target values.

2. The switched-capacitor voltage converter according to claim 1, further comprising:
a charge pump circuit, wherein an input terminal of the charge pump circuit is connected to an output terminal of the loop regulator circuit, and an output terminal of the charge pump circuit is connected to any one or both of the first clamp transistor and the second clamp transistor,
wherein the charge pump circuit is configured to cause any one or both of the first clamp transistor and the second clamp transistor to be completely turned on in response to that the switched-capacitor voltage converter is operating.

3. The switched-capacitor voltage converter according to claim 1, wherein the first clamp circuit comprises a first resistor, a first gate regulator element, a first diode, and a first transistor; wherein
   a negative electrode of the first gate regulator element is connected to the drain of the first clamp transistor, and a positive electrode of the first gate regulator element is connected to the source of the first clamp transistor via the first resistor; and
   a positive electrode of the first diode is connected to the drain of the first clamp transistor, a negative electrode of the first diode is connected to a drain of the first transistor, a source of the first transistor is connected to the gate of the first clamp transistor, and a gate of the first transistor is connected to a first connection point, wherein the first connection point is located at a position on a connection line between the first gate regulator element and the first resistor.

4. The switched-capacitor voltage converter according to claim 3, wherein the first gate regulator element is a Zener diode or a series-connected diode or a series-connected transistor.

5. The switched-capacitor voltage converter according to claim 1, wherein the first clamp circuit comprises: a second resistor, a second gate regulator element, a second diode, and a second transistor; wherein
   a negative electrode of the second gate regulator element is connected to the drain of the first clamp transistor via the second resistor, and a positive electrode of the second gate regulator element is connected to the source of the first clamp transistor; and
   a negative electrode of the second diode is connected to the gate of the first clamp transistor, a positive electrode of the second diode is connected to a drain of the second transistor, a source of the second transistor is connected to the drain of the first clamp transistor, and a gate of the second transistor is connected to a second connection point, wherein the second connection point is located at a position on a connection line between the second gate regulator element and the second resistor.

6. The switched-capacitor voltage converter according to claim 5, wherein the second gate regulator element is a Zener diode or a series-connected diode or a series-connected transistor.

7. The switched-capacitor voltage converter according to claim 1, wherein the switched-capacitor voltage conversion circuit is a two-way 2:1 switched-capacitor voltage conversion circuit.

8. The switched-capacitor voltage converter according to claim 1, wherein the switched-capacitor voltage conversion circuit comprises a first branch and a second branch, wherein one terminal of the first branch is connected to the reference terminal of the switched-capacitor voltage converter, and another terminal of the first branch is connected to ground; and one terminal of the second branch is connected to the reference terminal of the switched-capacitor voltage converter, and another terminal of the second branch is connected to the ground;
   wherein the first branch comprises:
      a first switched capacitor; and
      a first switch transistor, a second switch transistor, a third switch transistor, and a fourth switch transistor that are successively connected in series, wherein the first switched capacitor is connected in parallel to two terminals of the second switch transistor and third switch transistor that are series-connected;
   wherein the second branch comprises:
      a second switched capacitor; and
      a fifth switch transistor, a sixth switch transistor, a seventh switch transistor, and an eighth switch transistor that are successively connected in series, wherein the second switched capacitor is connected in parallel to two terminals of the sixth switch transistor and seventh switch transistor that are series-connected; and
   wherein a middle point of the first branch and a middle point of the second branch are both connected to the output terminal of the switched-capacitor voltage converter, the middle point of the first branch is located at a position on a connection line between the second switch transistor and the third switch transistor, and the middle point of the second branch is located at a position on a connection line between the sixth switch transistor and the seventh switch transistor.

9. The switched-capacitor voltage converter according to claim 8, wherein a conduction direction of switch transistors of the first branch is from a ground point of the first branch to the reference terminal of the switched-capacitor voltage converter, and a conduction direction of switch transistors of the second branch is from a ground point of the second branch to the reference terminal of the switched-capacitor voltage converter.

10. The switched-capacitor voltage converter according to claim 8, wherein the output terminal of the switched-capacitor voltage converter is connected to the ground via an output capacitor, and the output capacitor is further connected in parallel to an output resistor.

11. The switched-capacitor voltage converter according to claim 1, wherein the reference terminal of the switched-capacitor voltage converter is connected to ground via a reference capacitor.

* * * * *